United States Patent
Afzal et al.

(10) Patent No.: US 11,432,350 B2
(45) Date of Patent: Aug. 30, 2022

(54) SESSION MANAGEMENT FUNCTION (SMF) SELECTION BASED ON SUPPORTED PROTOCOL TYPE

(71) Applicant: T-Mobile USA, Inc., Bellevue, WA (US)

(72) Inventors: Muhammad W. Afzal, Bellevue, WA (US); Suliman Albasheir, Sammamish, WA (US); Suresh Thanneeru, Bothell, WA (US); Rahul Pal, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 71 days.

(21) Appl. No.: 16/940,329

(22) Filed: Jul. 27, 2020

(65) Prior Publication Data

US 2022/0030645 A1 Jan. 27, 2022

(51) Int. Cl.
*H04W 76/12* (2018.01)
*H04W 80/04* (2009.01)

(52) U.S. Cl.
CPC .......... *H04W 76/12* (2018.02); *H04W 80/045* (2013.01)

(58) Field of Classification Search
CPC ........................... H04W 76/12; H04W 80/045
See application file for complete search history.

(56) References Cited

U.S. PATENT DOCUMENTS

| | | | |
|---|---|---|---|
| 2018/0199243 A1* | 7/2018 | Bharatia | H04W 36/0011 |
| 2018/0199398 A1* | 7/2018 | Dao | H04L 41/5041 |
| 2018/0227743 A1* | 8/2018 | Faccin | H04L 65/1069 |
| 2018/0227873 A1* | 8/2018 | Vrzic | H04W 76/12 |
| 2018/0270781 A1* | 9/2018 | Baek | H04W 60/06 |
| 2018/0270782 A1* | 9/2018 | Park | H04W 76/34 |
| 2021/0352536 A1* | 11/2021 | Prabhakar | H04L 47/2416 |

FOREIGN PATENT DOCUMENTS

WO WO-2021069087 A1 * 4/2021 ............ H04W 48/18

* cited by examiner

*Primary Examiner* — Tejis Daya (57) ABSTRACT

A solution for establishing a data traffic (e.g., PDU) session for a user equipment (UE) on a network (e.g., 5G cellular network) comprises receiving, by an access node (e.g., AMF), from a network repository (e.g., NRF), identification of a plurality of available session management nodes (e.g., SMFs), wherein the identification of the plurality of available session management nodes indicates whether each session management node supports a first traffic type or a second traffic type (e.g., IPv4 or (IPv6); determining, by the access node, a requested traffic type identified by the UE; determining a match between supported and requested traffic types; based at least on the match, selecting a session management node from the plurality of available session management nodes; and based at least on selecting the session management node, establishing the traffic session with the UE and the selected session management node.

20 Claims, 5 Drawing Sheets

SESSION MANAGEMENT FUNCTION (SMF) SELECTION BASED ON SUPPORTED PROTOCOL TYPE

BACKGROUND

A user equipment (UE, e.g., a cellphone) may support one of a plurality of different internet protocol (IP) types, for example IP version 4 (IPv4) or IP version 6 (IPv6). On some networks (e.g., 5G cellular networks), not all 5G Session Management Function (SMF) nodes can support both IPv4 and IPv6, although this may be derivative capability limitation, based on the user plane function (UPF) to which the SMF is connected.

When the 5G Core Access and Mobility Management Function (AMF) node is attempting to set up a Protocol Data Unit (PDU) session for a UE, the AMF selects an SMF and informs that selected SMF of the IP type (e.g., IPv4 or IP v6). Unfortunately, if the UE had been requesting a PDU session type for a different IP type than the SMF can accommodate, the SMF will reject the connection. The AMF then selects another SMF, going down its list of available SMFs until it finds (by trial-and-error) an SMF that can support the requested IP type—or the retry limit is exhausted, at which time the session setup fails.

SUMMARY

The following summary is provided to illustrate examples disclosed herein, but is not meant to limit all examples to any particular configuration or sequence of operations.

A solution for establishing a traffic (e.g., protocol data unit (PDU) session or voice) session for a user equipment (UE) on a network (e.g., 5G cellular network) comprises receiving, by an access node (e.g., access and mobility management function (AMF)), from a network repository (e.g., network function repository function (NRF)), identification of a plurality of available session management nodes (e.g., session management function (SMFs)), wherein the identification of the plurality of available session management nodes indicates whether each session management node supports a first traffic type or a second traffic type (e.g., internet protocol (IP) version 4 (IPv4) or IP version 6 (IPv6)); determining, by the access node, a requested traffic type identified by the UE; determining a match between supported and requested traffic types; based at least on the match, selecting a session management node from the plurality of available session management nodes; and based at least on selecting the session management node, establishing the traffic session with the UE and the selected session management node.

BRIEF DESCRIPTION OF THE DRAWINGS

The disclosed examples are described below with reference to the accompanying drawing figures listed below, wherein.

Corresponding reference characters indicate corresponding parts throughout the drawings. References made throughout this disclosure, relating to specific examples, are provided for illustrative purposes, and are not meant to limit all implementations or to be interpreted as excluding the existence of additional implementations that also incorporate the recited features.

DETAILED DESCRIPTION

A solution for establishing a traffic session (e.g., protocol data unit (PDU) session or voice) for a user equipment (UE) on a network (e.g., 5G cellular network) comprises receiving, by an access node (e.g., access and mobility management function (AMF)), from a network repository (e.g., network function repository function (NRF)), identification of a plurality of available session management nodes (e.g., session management function (SMFs)), wherein the identification of the plurality of available session management nodes indicates whether each session management node supports a first traffic type or a second traffic type (e.g., internet protocol (IP) version 4 (IPv4) or IP version 6 (IPv6)); determining, by the access node, a requested traffic type identified by the UE; determining a match between supported and requested traffic types; based at least on the match, selecting a session management node from the plurality of available session management nodes; and based at least on selecting the session management node, establishing the traffic session with the UE and the selected session management node.

Aspects of the disclosure improve the speed, reliability, and cost efficiency of network operations by selecting a session management node based at least on a match between supported and requested traffic types. This advantageous operation precludes the scenario in which the access node wastes time attempting to establish a traffic session with a session management node that cannot support the requested traffic type, resulting in a rejection of the request by the session management node. This advantageous operation also precludes the scenario in which the access node expends its retry count or reaches a time-out by attempting to establish traffic sessions with a succession of session management nodes that cannot support the requested traffic type. This advantageous operation further precludes the expense of ensuring that all session management nodes necessarily support all potentially requested traffic types. Thus, the speed, reliability, and cost efficiency of network operations are improved. In some examples, a traffic session includes an IP Multimedia SubSystem (IMS) voice call.

Figure 1:
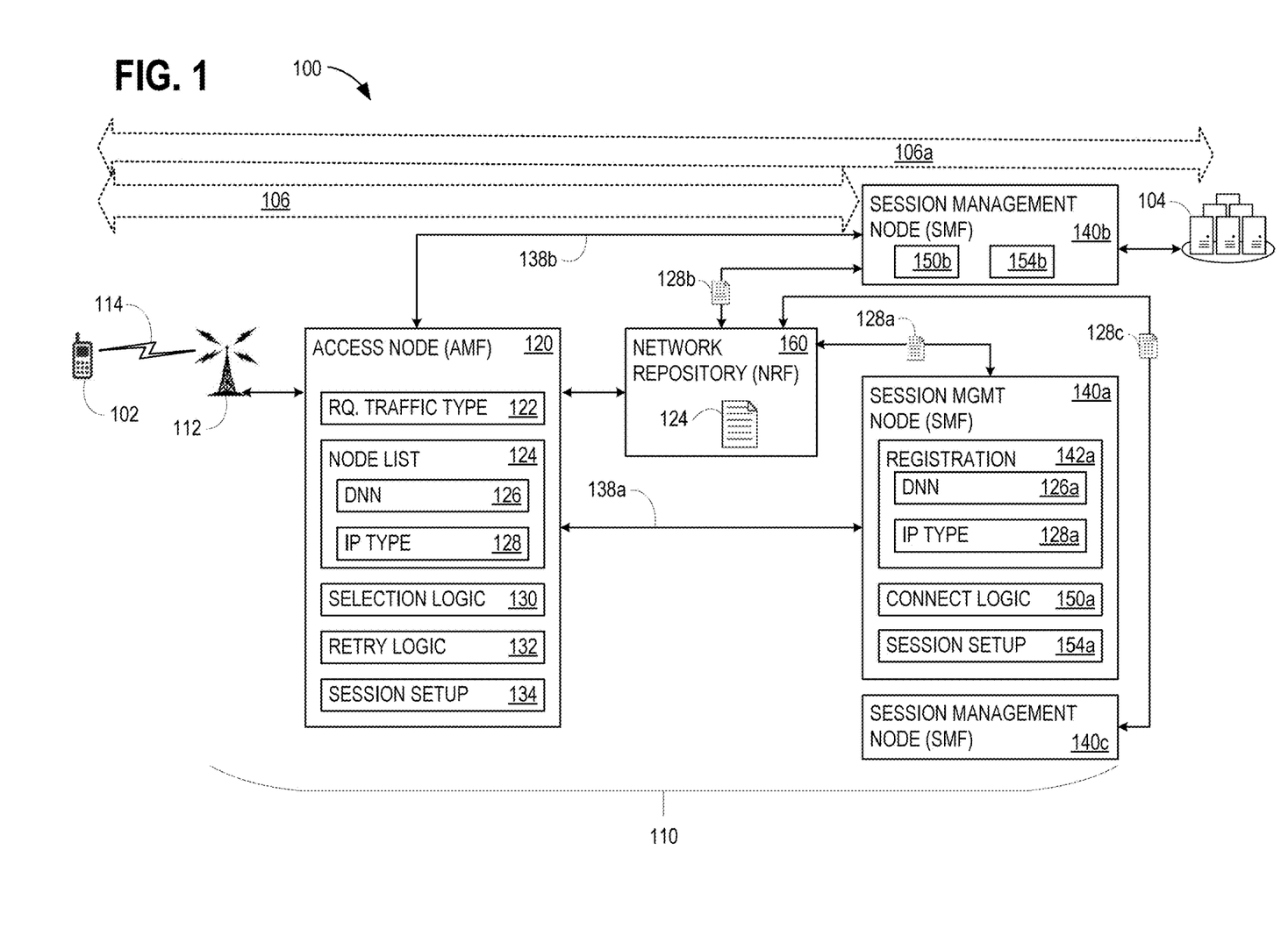
FIG. 1 illustrates an exemplary arrangement that may advantageously establish a traffic session for a user equipment (UE) on a network, using session management function (SMF) selection based on supported protocol type.

With reference now to the figures, FIG. 1 illustrates an exemplary arrangement 100 that may advantageously establish a traffic session 106 for a UE 102 on a network 110 (e.g., a cellular network), using SMF selection based on supported protocol type. In arrangement 100, UE 102 is attempting to establish traffic session 106 (e.g., a PDU session, such as internet traffic) with a packet data network (PDN) 104, for example to send or receive email, stream audio or video, visit a website, or send or receive digital files. Network 110 may be a fifth generation (5G) network or another type of network.

Network 110 includes a radio access network (RAN) 112, an access node 120, a network repository 160, and a plurality of session management nodes 140a, 140b and 140c. UE 102 communicates with RAN 112 over an air interface 114. In some examples, access node 120 comprises an AMF node, network repository 160 comprises an NRF node, and each of session management nodes 140a, 140b and 140c comprises an SMF node.

A 5G network has a service-based architecture (SBA), whereby the control plane functionality and common data repositories are delivered by way of a set of interconnected network functions (NFs), each with authorization to access each other's services. An AMF node performs the role of access point to a 5G core, thereby terminating the RAN control plane and receiving connection and session related information from a UE. An SMF is primarily responsible for interacting with the decoupled data plane, creating updating and removing PDU sessions and managing session context with a user plane function (UPF). A UPF performs packet routing and forwarding.

An NRF (NF Repository Function) serves as a repository of the 5G services and also supports discovery mechanisms that allow 5G elements to discover each other and obtain updated status of other elements. Establishing a traffic session (e.g., a PDU session) may set up a default bearer connection with between a UE and a PDN (via an SMF). For example, establishing traffic session 106 between UE 102 and session management node 140b is a part of establishing traffic session 106a between UE 102 and PDN 104. As illustrated, traffic session 106 is a portion of traffic session 106a; traffic session 106a extends to the portion between session management node 140b and PDN 104.

Figure 2:
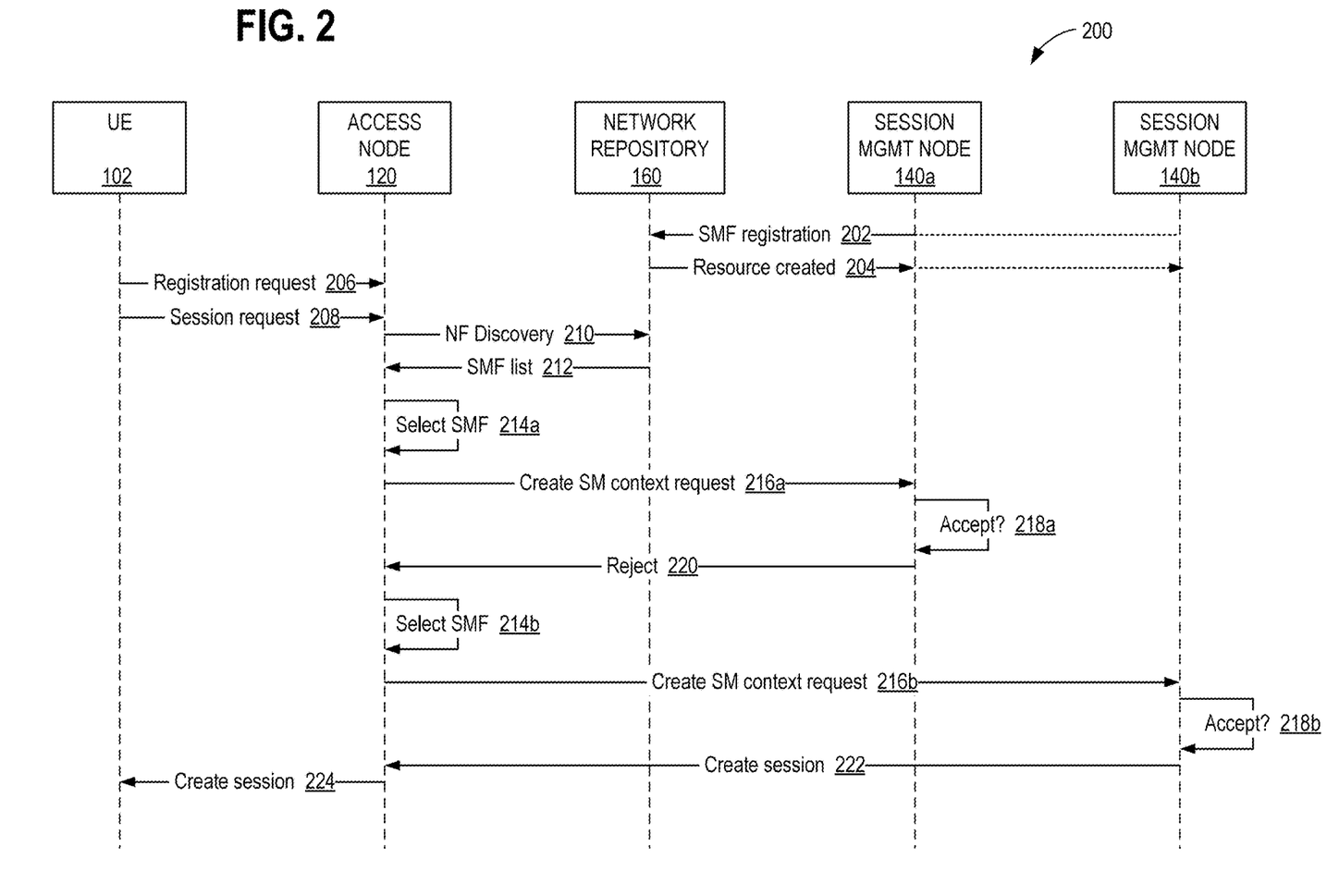
FIG. 2 illustrates a messaging sequence that may be used within the arrangement of FIG. 1.
Figure 3:
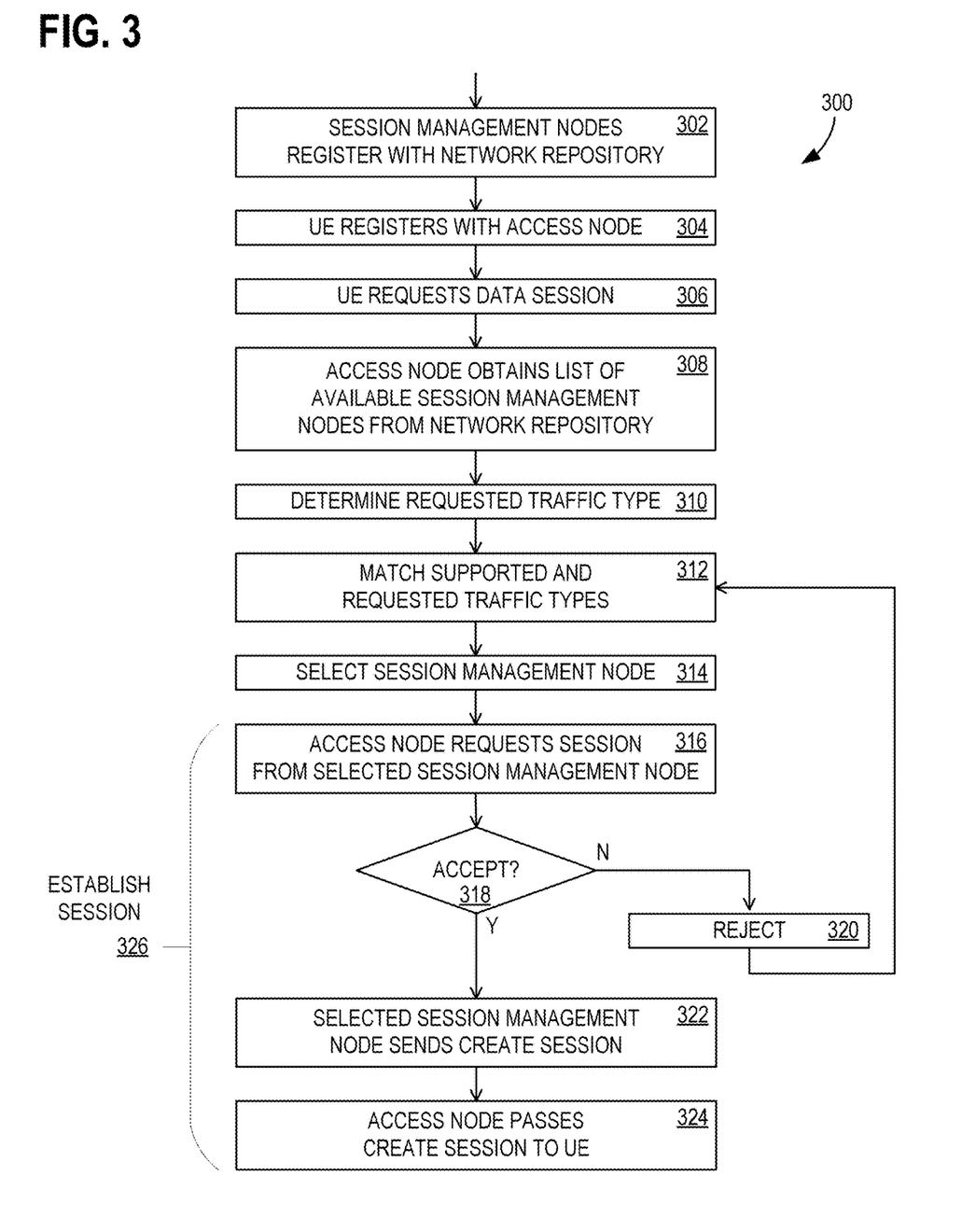
FIG. 3 illustrates a flow chart of exemplary operations associated with establishing a traffic session for a UE on a network that us advantageously employing SMF selection based on supported protocol type.

Further description of FIG. 1 will be made with additional reference to FIGS. 2 and 3. FIG. 2 is a messaging sequence diagram 200 that shows a series of messages that may be used within arrangement 100, and is described in conjunction with FIG. 3. FIG. 3 illustrates a flow chart 300 of exemplary operations associated with establishing traffic session 106 for UE 102 on network 110. The messages of messaging sequence diagram 200 occur during various operations of flow chart 300. In some examples, at least a portion of messaging sequence diagram 200 and at least a portion of flow chart 300 may be performed using one or more computing devices 500 of FIG. 5. FIGS. 1-3 should be viewed together.

At operation 302 (FIG. 3), each of session management nodes 140a-140c sends a registration request message 202 (FIG. 2) to network repository 160, which responds with a resource created message 204. In some examples, message 204 comprises an HTTP 201 created success status response code. When registering with network repository 160 (using message 202), session management node 140a sends registration information 142a. Registration information 142a includes a data network name (DNN) 126a, which may be in the form of an access point name (APN), and an IP type 128a. IP type 128a identifies whether session management node 140a supports a first traffic type (e.g., IPv4) or a second traffic type (IPv6) with its session setup component 154a. In some examples, the first traffic type comprises an internet protocol (IP) version 4 (IPv4) type, and the second traffic type comprises an IP version 6 (IPv6) type. IPv4 uses a 32-bit internet addresses, whereas IPv6 uses a 128-bit internet addresses to support a larger number of addresses. In some examples, IP type 128a indicates IPv4v6, meaning that session management node 140a is able to support both IPv4 and IPv6.

Session management node 140b and session management node 140c each also send an indication of their respective supported IP types when registering with network repository 160. Thus, operation 302 includes registering, by each session management node 140a, 140b, and 140c of the plurality of available session management nodes 140a-140c, with network repository 160, wherein registering includes identifying whether each registering session management node 140a, 140b, or 140c supports the first traffic type or the second traffic type. Session management node 140a is shown as sending its IP type 128a to network repository 160, session management node 140b is shown as sending its IP type 128b to network repository 160, and session management node is shown as sending its IP type 128c to network repository 160c. Network repository 160 compiles the received registration information, including DNNs and IP type indications for each one of the plurality of session management nodes 140a-140c, and places the information into a session management node list 124.

Operation 304 includes registering, by UE 102, with access node 120. For example, UE 102 sends a registration request message 206 to access node 120, and since access node 120 performs the role of access point, message 206 acts to register UE 102 with network 110. At 306, UE 102 sends a session establishment request message 208 to access node 120, which identifies a requested traffic type 122. Operation 306 also includes receiving a request (message 208) for traffic session 106, by access node 120, from UE 102. In some examples, the request for traffic session 106 identifies requested traffic type 122. In some examples, access node 120 determines requested traffic type 122 another way, such as from registration request message 206. In some examples, traffic session 106 comprises a PDU session. In some examples, the request for traffic session 106 (message 208) comprises a PDU Session Establishment Request. In some examples, message 208 includes a PDU session type field. In some examples, authorized PDU session type field values include IPv4, IPv6, IPv4v6 (indicating either IPv4 or IPv6), Unstructured, and Ethernet.

At 308, access node sends an NF discovery message 210 to network repository 160, and network repository 160 provides the information of the available NF instances (session management nodes 140a-140c) as session management node list 124 in message 212. Operation 308 includes receiving, by access node 120, from network repository 160, identification (session management node list 124) of a plurality of available session management nodes 140a-140c. The identification of the plurality of available session management nodes 140a-140c indicates whether each session management node 140a, 140b, or 140c supports a first traffic type or a second traffic type. In this manner, access node 120 node obtains a list of available session management nodes 140a-140c from network repository 160.

Operation 310 includes determining, by access node 120, a requested traffic type identified by the UE (requested traffic type 122), and operation 312 includes determining a match between supported and requested traffic types. In some examples, this determining is performed by access node 120. To accomplish this, access node 120 compares requested traffic type 122 with IP type 128 (for each of session management nodes 140a-140c) within session management node list 124. When a match is found, operation 314 includes, based at least on the match, selecting a session management node 140a, 140b, or 140c from the plurality of available session management nodes 140a-140c. That is, in some examples, access node 120 selects DNN 126 for whichever of session management node 140a, 140b, or 140c corresponds to the matching IP type 128. The selection may be performed using a selection logic 130.

Operations 310-314 are indicated as select SMF 214a in FIG. 2, and in this instance, the selected session management node is session management node 140a. Operation 316 includes requesting, by access node 120, from the selected session management node, traffic session 106 for UE 102. In some examples, the selected session management node (e.g., any of session management nodes 140a-140c) and access node 120 communicate over an N11 interface (e.g., connection 138a for session management nodes 140a or connection 138b for session management nodes 140b). In this instance of operation 316, access node 120 sends a create SM context request message 216a to session management node 140a. See 3GPP TS 23.502.

In decision operation 318 (accept decision 218a in FIG. 2), session management node 140a determines whether it can support requested traffic session 106, using a connect logic 150a. Possible reasons for session management node 140a to reject the request in message 216a include insufficient resources (reject reason #26, in some examples), user authentication or authorization failure (reject reason #29, in some examples), and others. However a rejection for unknown PDU session type (reject reason #28, in some examples) will not occur, because session management node 140a has already indicated that it can support requested traffic type 122.

For this illustrated example, session management node 140a rejects the request for traffic session 106, although for some reason other than the wrong IP type. In operation 320, session management node 140a sends a reject message 220 to access node 120. Flow chart 300 returns to operation 312, and access node uses a retry logic 132 to try another session management node. In some examples, retry logic 132 has a counter of a number of failed attempts before returning a rejection message to UE 102 and ceasing further attempts. In some examples, retry logic 132 has a timer to time-out each individual request before retrying with a different session management node. In some examples, retry logic 132 has a timer to time-out the total number of attempts before returning a rejection message to UE 102 and ceasing further attempts.

A second pass through operations 312-314 is indicated as select SMF 214b in FIG. 2, and in this instance, the selected session management node is session management node 140b. In this second instance of operation 316, access node 120 sends a create session request message 216b to session management node 140b. Connect logic 150b of session management node 140b decides, in decision operation 318 (accept decision 218b in FIG. 2), that it can support request for traffic session 106 using session setup component 154b. In operation 322, newly-selected session management node 140b responds to access node 120 with a create session response message 222. In operation 324, access node 120 passes a create session response message 224 to UE 102. A session setup component 134 manages the establishment of traffic session 106. Together, operations 316, 322, and 324 comprise a session establishment operation 326. Operation 326 includes, based at least on selecting the session management node, establishing traffic session 106 with UE 102 and selected session management node 140b.

Figure 4:
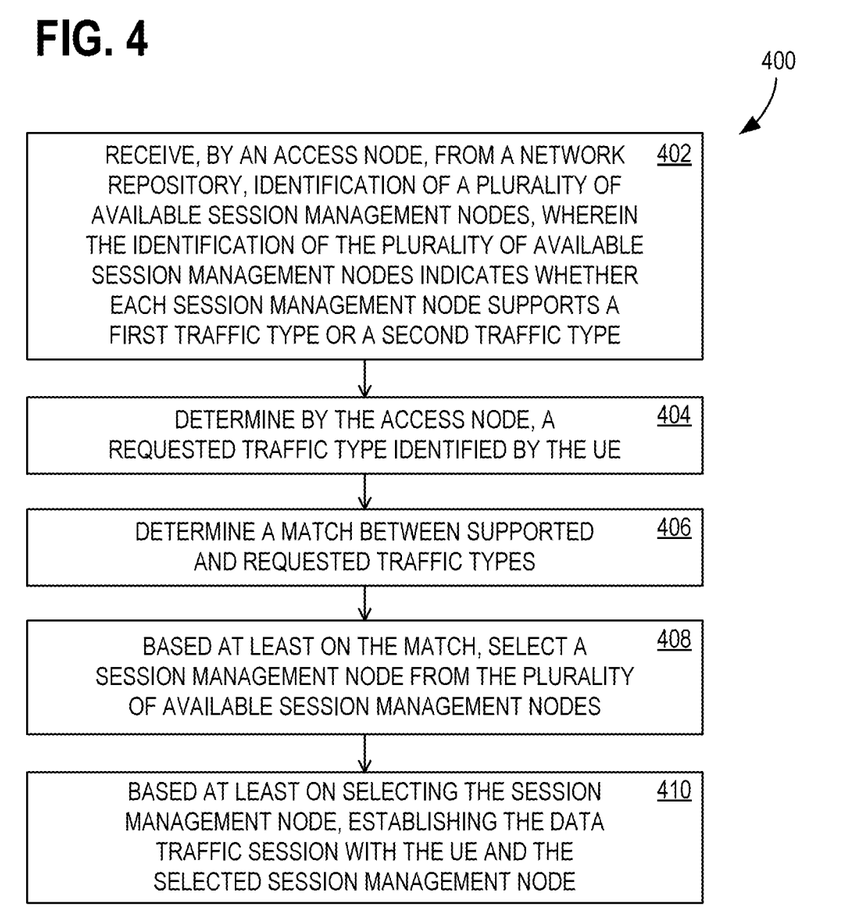
FIG. 4 illustrates another flow chart of exemplary operations associated with establishing a traffic session for a UE on a network that us advantageously employing SMF selection based on supported protocol type.

FIG. 4 illustrates a flow chart 400 of exemplary operations associated with establishing a traffic session for a UE on a network. In some examples, at least a portion of flow chart 400 may be performed using one or more computing devices 500 of FIG. 5. Operation 402 includes receiving, by an access node, from a network repository, identification of a plurality of available session management nodes, wherein the identification of the plurality of available session management nodes indicates whether each session management node supports a first traffic type or a second traffic type. Operation 404 includes determining, by the access node, a requested traffic type identified by the UE. Operation 406 includes determining a match between supported and requested traffic types. Operation 408 includes, based at least on the match, selecting a session management node from the plurality of available session management nodes. Operation 410 includes, based at least on selecting the session management node, establishing the traffic session with the UE and the selected session management node.

Figure 5:
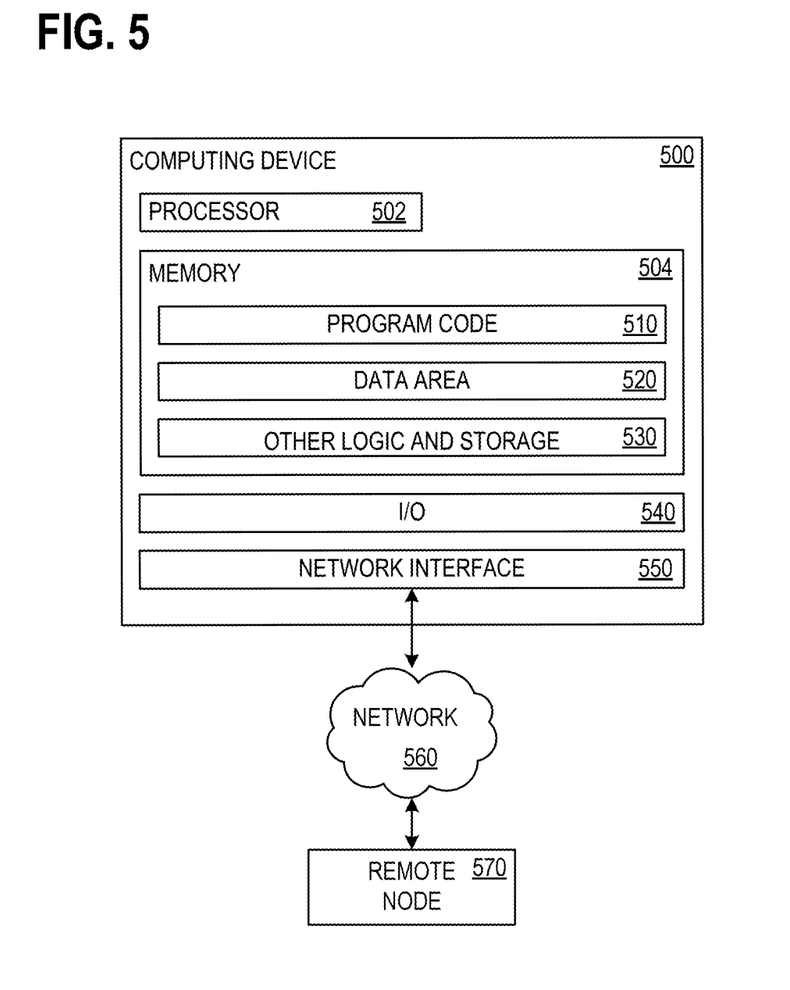
FIG. 5 illustrates a block diagram of a computing device that may be used as a component of the arrangement illustrated in FIG. 1.

FIG. 5 illustrates a block diagram of computing device 500 that may be used as a component of arrangement 100 of FIG. 1, for example, as a portion of UE 102, PDN 104, RAN 112, access node 120, session management nodes 140a-140c, network repository, and/or any other component described herein that may require computational or storage capacity. Computing device 500 has at least a processor 502 and a memory 504 that holds program code 510, data area 520, and other logic and storage 530. Memory 504 is any device allowing information, such as computer executable instructions and/or other data, to be stored and retrieved. For example, memory 504 may include one or more random access memory (RAM) modules, flash memory modules, hard disks, solid-state disks, persistent memory devices, and/or optical disks. Program code 510 comprises computer executable instructions and computer executable components including any instructions necessary to perform operations described herein. Data area 520 holds any data necessary to perform operations described herein. Memory 504 also includes other logic and storage 530 that performs or facilitates other functions disclosed herein or otherwise required of computing device 500. An input/output (I/O) component 540 facilitates receiving input from users and other devices and generating displays for users and outputs for other devices. A network interface 550 permits communication over a network 560 with a remote node 570, which may represent another implementation of computing device 500. For example, a remote node 570 may represent another of the above-noted nodes within arrangement 100.

ADDITIONAL EXAMPLES

An exemplary system for establishing a traffic session for a UE on a network comprises: a processor; and a computer-readable medium storing instructions that are operative upon execution by the processor to: receive, by an access node, from a network repository, identification of a plurality of available session management nodes, wherein the identification of the plurality of available session management nodes indicates whether each session management node supports a first traffic type or a second traffic type; determine, by the access node, a requested traffic type identified by the UE; determine a match between supported and requested traffic types; based at least on the match, select a session management node from the plurality of available session management nodes; and based at least on selecting the session management node, establish the traffic session with the UE and the selected session management node.

An exemplary method of establishing a traffic session for a UE comprises: receiving, by an access node, from a network repository, identification of a plurality of available session management nodes, wherein the identification of the plurality of available session management nodes indicates whether each session management node supports a first traffic type or a second traffic type; determining, by the access node, a requested traffic type identified by the UE; determining a match between supported and requested traffic types; based at least on the match, selecting a session management node from the plurality of available session management nodes; and based at least on selecting the session management node, establishing the traffic session with the UE and the selected session management node.

One or more exemplary computer storage devices has computer-executable instructions stored thereon for establishing a data traffic for a UE on a network, which, on execution by a computer, cause the computer to perform operations comprising: receiving, by an access node, from a network repository, identification of a plurality of available session management nodes, wherein the identification of the plurality of available session management nodes indicates whether each session management node supports a first traffic type or a second traffic type; determining, by the access node, a requested traffic type identified by the UE; determining a match between supported and requested traffic types; based at least on the match, selecting a session management node from the plurality of available session management nodes; and based at least on selecting the session management node, establishing the traffic session with the UE and the selected session management node.

Alternatively, or in addition to the other examples described herein, examples include any combination of the following:
    the first traffic type comprises an IPv4 type;
    the second traffic type comprises an IPv6 type;
    registering, by each session management node of the plurality of available session management nodes, with the network repository;
    the registering with the network repository includes identifying whether each registering session management node supports the first traffic type or the second traffic type;
    registering, by the UE, with the access node;
    receiving a request for the traffic session, by the access node, from the UE;
    the request for the traffic session identifies the requested traffic type;
    the registering with the access node includes identifying the requested traffic type;
    the request for the traffic session comprises a PDU Session Establishment Request;
    establishing the traffic session with the UE and the selected session management node comprises requesting, by the access node, from the selected session management node, the traffic session for the UE;
    the access node comprises an AMF node;
    the network repository comprises an NRF node;
    the session management nodes comprise SMF nodes;
    the traffic session comprises a PDU session; and
    the selected session management node and the access node communicate over an N11 interface.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of establishing a traffic session for a user equipment (UE) on a network, the method comprising:
    registering, by each session management node of a plurality of available session management nodes, with the network repository, wherein the registering with the network repository includes identifying whether each registering session management node supports a first traffic type or a second traffic type, and wherein the first traffic type comprises an internet protocol (IP) version 4 (IPv4) type and the second traffic type comprises an IP version 6 (IPv6) type;
    receiving a request for the traffic session, by an access node, from the UE, wherein the request for the traffic session identifies a requested traffic type;
    receiving, by the access node, from a network repository, identification of the plurality of available session management nodes, wherein the identification of the plurality of available session management nodes indicates whether each session management node supports the first traffic type or the second traffic type;
    determining, by the access node, the requested traffic type identified by the UE;
    determining, by the access node, a match between supported and requested traffic types;
    based at least on the match, selecting, by the access node, a session management node from the plurality of available session management nodes; and
    based at least on selecting the session management node, establishing the traffic session with the UE and the selected session management node.

2. The method of claim 1, wherein the request for the data traffic session comprises a PDU Session Establishment Request.

3. The method of claim 1, further comprising:
    determining, by the session management node, whether it can support requested data traffic session.

4. The method of claim 3, wherein determining, by the session management node, whether it can support requested data traffic session includes determining whether there has been a user authentication or authorization failure.

5. The method of claim 1, wherein establishing the traffic session with the UE and the selected session management node comprises:
    requesting, by the access node, from the selected session management node, the traffic session for the UE.

6. The method of claim 1, wherein the access node comprises an access and mobility management function (AMF) node.

7. The method of claim 1, wherein the network repository comprises a network function repository function (NRF) node.

8. The method of claim 1, wherein the session management nodes comprise session management function (SMF) nodes.

9. The method of claim 1, wherein the traffic session comprises a protocol data unit (PDU) session.

10. The method of claim 1, wherein the selected session management node and the access node communicate over an N11 interface.

11. A system for establishing a traffic session for a user equipment (UE) on a network, the system comprising:
a processor; and
a computer-readable medium storing instructions that are operative upon execution by the processor to:
register, by each session management node of a plurality of available session management nodes, with the network repository, wherein registering with the network repository includes identifying whether each registering session management node supports a first traffic type or a second traffic type, and wherein the first traffic type comprises an internet protocol (IP) version 4 (IPv4) type and the second traffic type comprises an IP version 6 (IPv6) type;
receive a request for the traffic session, by an access node, from the UE, wherein the request for the traffic session identifies a requested traffic type;
receive, by the access node, from a network repository, identification of the plurality of available session management nodes, wherein the identification of the plurality of available session management nodes indicates whether each session management node supports the first traffic type or the second traffic type;
determine, by the access node, the requested traffic type identified by the UE;
determine, by the access node, a match between supported and requested traffic types;
based at least on the match, select, by the access node, a session management node from the plurality of available session management nodes; and
based at least on selecting the session management node, establish the traffic session with the UE and the selected session management node.

12. The system of claim 11, wherein the request for the data traffic session comprises a PDU Session Establishment Request.

13. The system of claim 11, wherein the operations are further operative to:
determine, by the session management node, whether it can support requested data traffic session.

14. The system of claim 13, wherein determining, by the session management node, whether it can support requested data traffic session includes determining whether there has been a user authentication or authorization failure.

15. The system of claim 11, wherein establishing the traffic session with the UE and the selected session management node comprises:
requesting, by the access node, from the selected session management node, the traffic session for the UE.

16. The system of claim 11:
wherein the access node comprises an access and mobility management function (AMF) node;
wherein the network repository comprises a network function repository function (NRF) node;
wherein the session management nodes comprise session management function (SMF) nodes; and
wherein the traffic session comprises a protocol data unit (PDU) session.

17. The system of claim 11, wherein the selected session management node and the access node communicate over an N11 interface.

18. One or more computer storage devices having computer-executable instructions stored thereon for establishing a traffic session for a user equipment (UE) on a network, which, on execution by a computer, cause the computer to perform operations comprising:
registering, by each session management node of a plurality of available session management nodes, with the network repository, wherein registering with the network repository includes identifying whether each registering session management node supports a first traffic type or a second traffic type, wherein the first traffic type comprises an internet protocol (IP) version 4 (IPv4) type and the second traffic type comprises an IP version 6 (IPv6) type;
receiving a request for the traffic session, by an access node, from the UE, wherein the request for the traffic session identifies a requested traffic type;
receiving, by the access node, from a network repository, identification of the plurality of available session management nodes, wherein the identification of the plurality of available session management nodes indicates whether each session management node supports the first traffic type or the second traffic type;
determining, by the access node, the requested traffic type identified by the UE;
determining, by the access node, a match between supported and requested traffic types;
based at least on the match, selecting, by the access node, a session management node from the plurality of available session management nodes; and
based at least on selecting the session management node, establishing the traffic session with the UE and the selected session management node.

19. The one or more computer storage devices of claim 18:
the request for the data traffic session comprises a PDU Session Establishment Request;
wherein the access node comprises an access and mobility management function (AMF) node;
wherein the network repository comprises a network function repository function (NRF) node;
wherein the session management nodes comprise session management function (SMF) nodes; and
wherein the traffic session comprises a protocol data unit (PDU) session; and
wherein the selected session management node and the access node communicate over an N11 interface.

20. The one or more computer storage devices of claim 18,
wherein establishing the traffic session with the UE and the selected session management node comprises requesting, by the access node, from the selected session management node, the traffic session for the UE.

* * * * *